United States Patent [19]

Wisner et al.

[11] Patent Number: 5,620,161
[45] Date of Patent: Apr. 15, 1997

[54] LOCKING PEDESTAL FOR AUTOMOTIVE SEATING

[75] Inventors: Donald W. Wisner, Grand Haven; Erik J. Denslow, Spring Lake, both of Mich.

[73] Assignee: Track Corp., Grand Haven, Mich.

[21] Appl. No.: 519,452

[22] Filed: Aug. 25, 1995

[51] Int. Cl.$^6$ .................................................. F16M 13/00
[52] U.S. Cl. .......................... 248/429; 248/903; 296/68.1
[58] Field of Search ................................. 248/429, 424, 248/430, 903; 296/68.1

[56] References Cited

U.S. PATENT DOCUMENTS

| | | | |
|---|---|---|---|
| 5,106,144 | 4/1992 | Hayakawa et al. | 248/429 X |
| 5,137,244 | 8/1992 | Negi | 248/429 X |
| 5,490,706 | 2/1996 | Totani | 296/68.1 |

*Primary Examiner*—Ramon O. Ramirez
*Attorney, Agent, or Firm*—Warner Norcross & Judd

[57] ABSTRACT

An automotive seat assembly including a pedestal, a seat rail assembly on the pedestal, and an interlock for mechanically retaining the rail mechanism on the pedestal. The interlock includes a pair of brackets secured to opposite sides of the pedestal and extending up and over each rail of the seat rail mechanism. The interlock reduces the likelihood that the rail assembly, and therefore the seat, will leave the pedestal in case of vehicle impact. In an alternative embodiment, the interlock is integral with the pedestals; and the sidewalls of the pedestal, rather than separate brackets, extend over the seat rails.

12 Claims, 3 Drawing Sheets

LOCKING PEDESTAL FOR AUTOMOTIVE SEATING

BACKGROUND OF THE INVENTION

The present invention relates to automotive seating, and more particularly to an apparatus for securing automotive seating within an automotive vehicle.

A conventional automotive seat includes a rail mechanism supporting the seat frame for forward and backward movement within the vehicle. The rail mechanism is attached directly or indirectly to the floor of the vehicle. In sedans and other relatively low profile vehicles, the rail mechanism is secured directly to the floor. However, in higher profile vehicles such as vans and recreational vehicles, the rail mechanism is mounted on a pedestal to support the occupant at a higher level and provide improved field of vision from the vehicle.

FIGS. 1 and 2 illustrate a conventional raised automotive seat assembly 10. The assembly includes a seat frame 11, a rail mechanism 12, and a pedestal 14. The pedestal 14 is secured to the floor 16 of the vehicle and the rail mechanism 12 is mounted atop the pedestal 14. The pedestal 14 includes a horizontal upper flange 20 and a pair of vertical support tabs 13. The rail mechanism 12 rests on the flange 20 and is secured to the pedestal 14 by bolts or other fasteners extending through these tabs 13.

This conventional arrangement is sufficient for maintaining a conventional seat upon the pedestal. However, it may not have sufficient strength to support a seat incorporating an integral restraint system. In a conventional seat belt arrangement, the seat belt is anchored to the floor pan, body pillar, or other structural member of the vehicle. These structural members have sufficient strength to withstand the forces generated during a collision. With integral restraint systems, however, the seat is required to withstand these forces. These forces are translated to the rail mechanism 12 and the pedestal 14. The bolts interconnecting the rail 12 and the pedestal 14 may fail. As a result, the seat may break loose from the pedestal, presenting a risk of injury to the occupant.

SUMMARY OF THE INVENTION

The aforementioned problems are overcome by the present invention wherein the seat pedestal assembly includes a retention mechanism that extends over, or wraps around, the top of the rail mechanism to mechanically retain the rail mechanism on the pedestal.

In a preferred embodiment, the retention mechanism is an L-shaped bracket having a first wall secured to the side of the pedestal and a second wall extending over the top of the rail mechanism. The bracket reinforces the pedestal arrangement by holding the rail mechanism securely against the pedestal-even in many front and rear-end collisions.

In an alternative embodiment, the retention mechanism is integral with the pedestal. Specifically, the sidewalls of the pedestal extend upwardly beyond the rail supporting flange and wrap around the top of the rail mechanism. In addition, a lower retention flange is pushed inwardly from the sidewalls to support the rail mechanism.

The present invention provides a simple and effective apparatus for reinforcing the seat assembly to reduce the likelihood of the seat breaking away from the pedestal during a collision. The design of the present invention allows it to be installed both as an OEM and as an aftermarket equipment.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
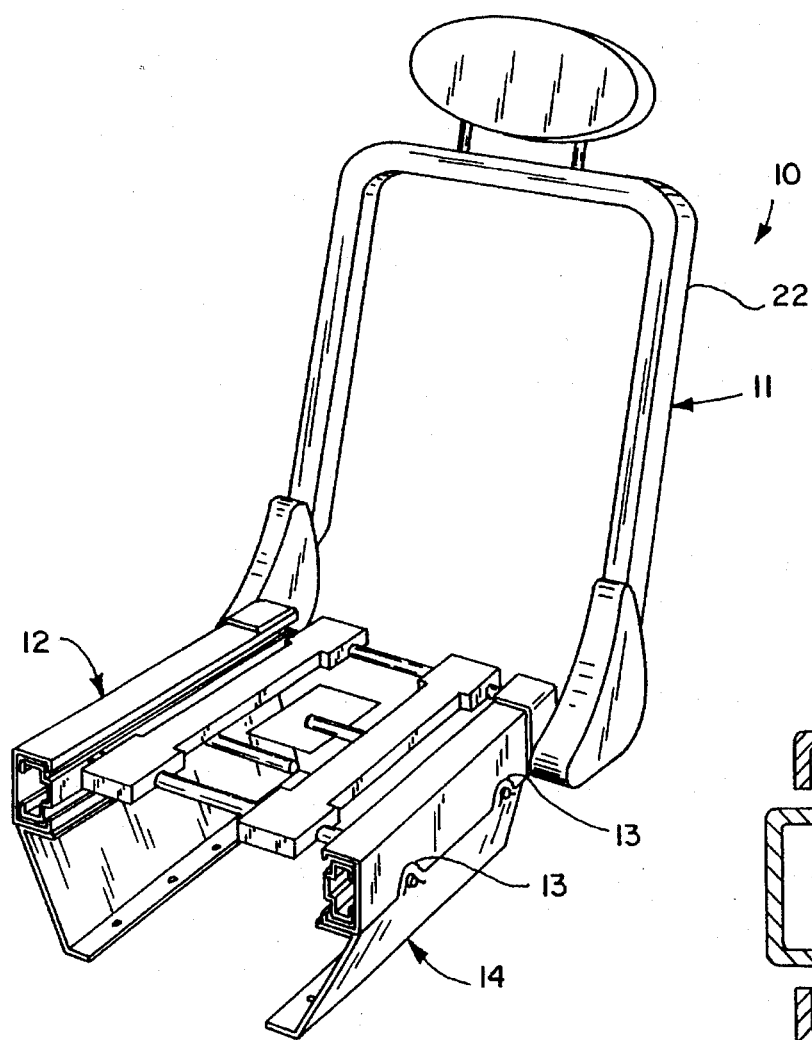
FIG. 1 is a perspective view of a prior art automotive seat assembly.
Figure 2:
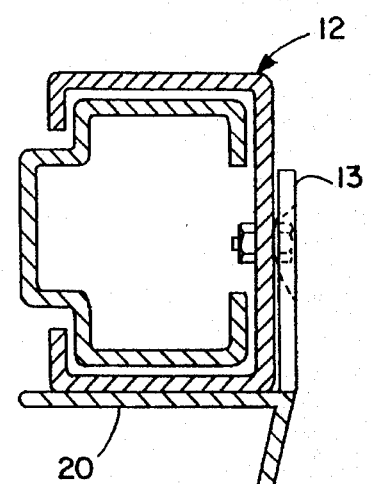
FIG. 2 is a sectional view through the prior art pedestal and rail mechanism shown in FIG. 1.
Figures 3, 4:
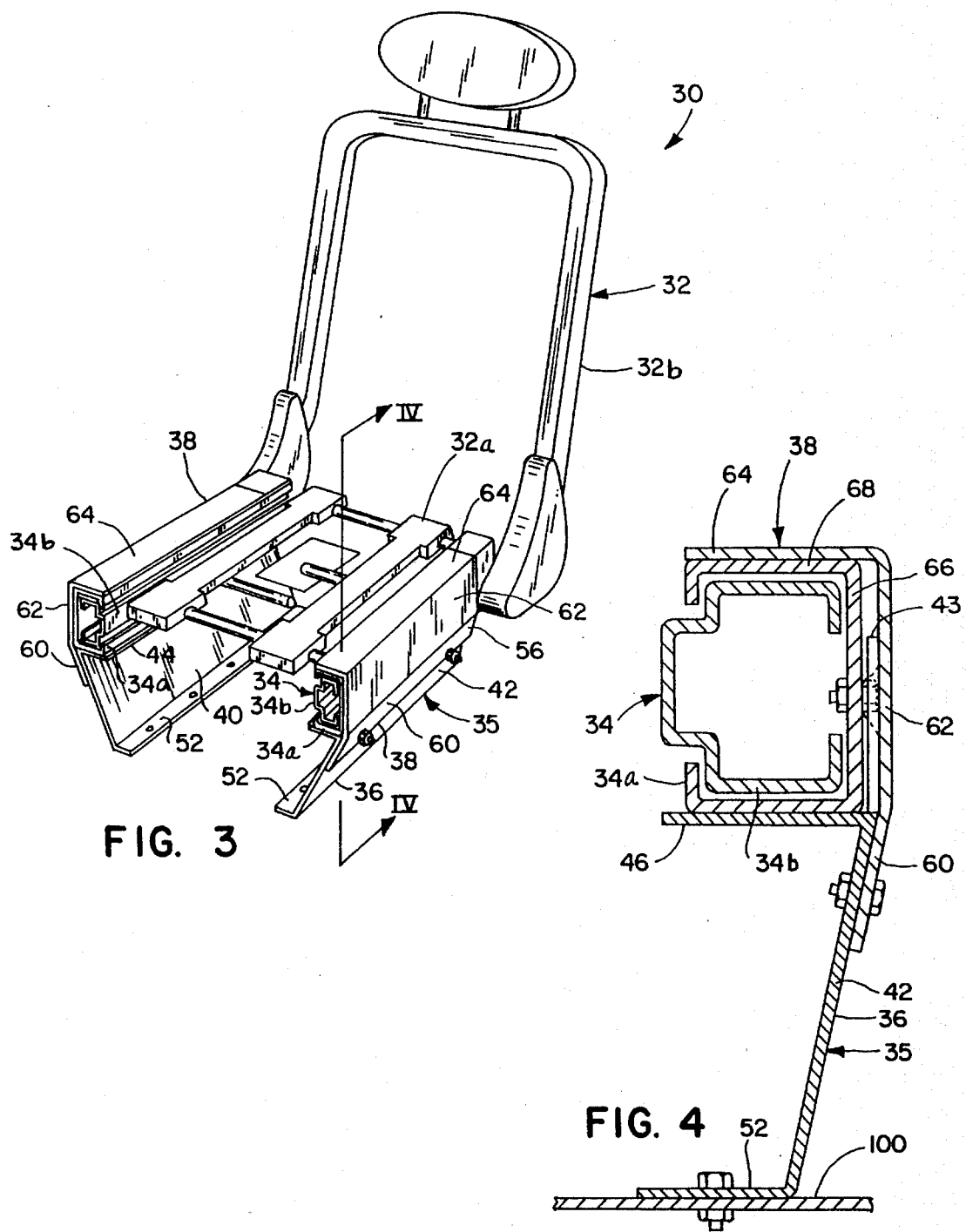
FIG. 3 is a perspective view of an automotive seat assembly according to the present invention.
FIG. 4 is a sectional view taken along line IV—IV in FIG. 3 of the pedestal assembly and the rail mechanism.

An automotive vehicle seat assembly incorporating the present invention is illustrated in FIG. 3 and generally designated 30. The seat assembly 30 includes a seat frame 32, a rail mechanism 34, and a pedestal assembly 35. The seat frame 32 is supported by the rail mechanism 34, and the rail mechanism is mounted on the pedestal assembly 35. The height of the pedestal assembly 35 is selected to seat the occupant at the desired height. The rail mechanism permits forward and backward movement of the seat frame with respect to the pedestal assembly 35.

The seat frame 32 is generally well known to those skilled in the art and consequently will not be described in detail. Suffice it to say that the frame includes a seat portion 32a and a back portion 32b. Typically, the back portion reclines with respect to the seat portion. Often, seat actuators or drive motors are mounted on the frame to adjust seat height, seat angle, recliner angle, lumbar support, and the like.

Although not shown, the seat frame would be upholstered prior to use according to well known techniques. Suitable springs, supports, seating cushions, upholstery, and/or fabric would be installed to provide a finished seat.

The rail mechanism 34 also is generally well known to those skilled in the art and also will not be described in detail. Suffice it to say that the mechanism 34 includes an outer rail 34a attached to the pedestal assembly 35 and an inner rail 34b to which the seat frame 32 is attached. The inner rail 34a is telescopically received within the outer rail 34b to support the seat frame for forward and backward movement with respect to the pedestal. Often, seat actuators or drive motors are mounted on the frame to adjust the position of the seat.

The pedestal assembly 35 (FIGS. 3 and 4) includes a pedestal 36 and an interlock bracket 56. The pedestal 36 is secured to the floor 100 of the automotive vehicle to provide a base for the seating assembly 30. In the disclosed embodiment, the pedestal 36 includes spaced apart sidewalls 40 and 42. The sidewalls 40 and 42 extend upwardly and outwardly from the floor 100. A lower flange 52 extends inwardly from the bottom of each sidewall 40 and 42. The lower flanges 52 are secured to the floor 100 of the vehicle by welding, bolts, or other conventional fasteners. An upper flange 44 and 46 extends inwardly from the top of each sidewall 40 and 42.

The upper flanges 44 and 46 are of sufficient width to support rail mechanism 34. A pair of support tabs 43 extend vertically from each upper flange 44 and 46. A hole extends through each tab 43 to allow the rail mechanism 34 to be bolted to the pedestal. The described pedestal design is merely exemplary and will vary depending on the design of the vehicle and the seat, space requirements within the vehicle, aesthetics, and other factors.

Figure 5:
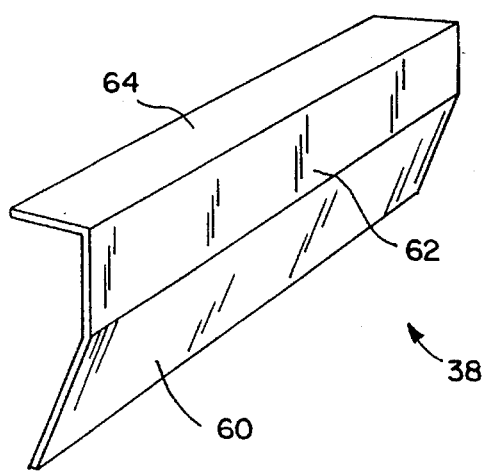
FIG. 5 is a perspective view of the interlock bracket.
Figure 7:
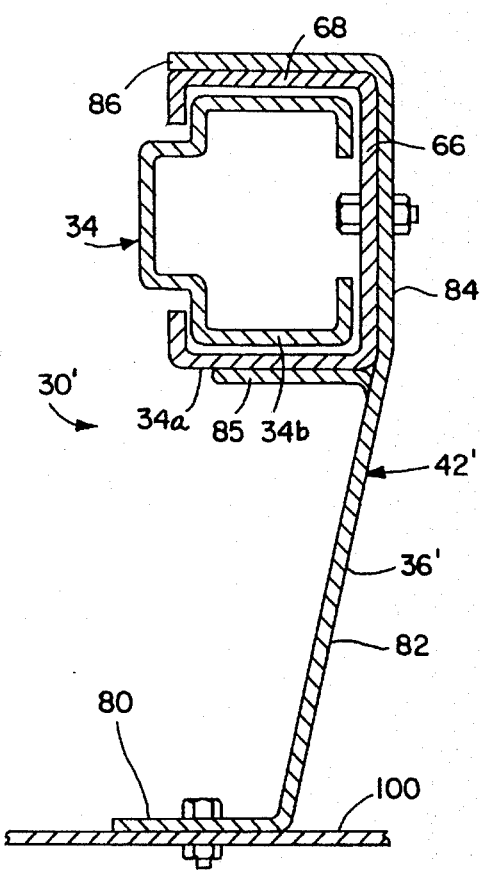
FIG. 7 is a sectional view taken along line VII—VII in FIG. 6 of the pedestal assembly and the rail mechanism.
Figure 6:
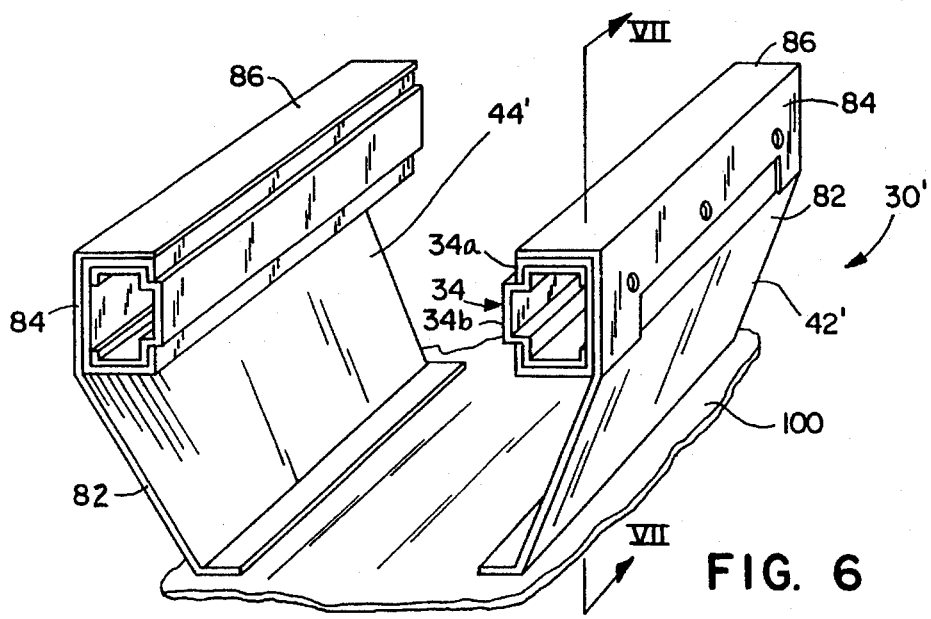
FIG. 6 is a perspective view of an alternative embodiment of an automotive seat assembly.

The interlock or locking brackets 38 (FIGS. 3–5) aid in securing the rail mechanism 34 to the pedestal 36. One locking bracket 38 is provided at each of the opposite sides of the pedestal assembly 35 to trap or secure one of the rail mechanisms. Only the right bracket (when viewed from the front of the seat assembly 30) will be described. The bracket 38 preferably is stamped from sheet metal having sufficient thickness to provide the desired supplemental support. As illustrated in FIGS. 4 and 5, the bracket 38 includes a lower inclined portion 60 secured to the sidewall 42 of the pedestal 36, a central vertical portion 62 that extends parallel to the sidewall 66 of the rail mechanism 34, and an upper horizontal portion 64 that extends over the top wall 68 of the rail mechanism 34.

The lower portion 60 of the interlock 56 is inclined and/or shaped to follow the contour of the pedestal 36. In the disclosed embodiment, the lower portion 60 is substantially flat and is parallel to the sidewall 42. Obviously, the lower portion 36 can vary in shape to match the contour of the associated pedestal. The central portion 62 extends upwardly from the lower portion 60 and is substantially the same height as the sidewall 66 of the rail mechanism 34. The upper portion 64 extends inwardly from the central portion 62 and is substantially the same width as the top wall 68 of the rail mechanism 34. In the preferred embodiment, upper portion 64 engages or traps top wall 68.

In operation, the interlock brackets 38 reinforce the seat assembly to reduce the likelihood that the rail mechanism 34 will separate from the pedestal 36 during a collision. By altering the stock from which the interlocks are manufactured and/or the method by which the interlocks are secured to the pedestal, the amount of reinforcement provided by the interlocks can be varied. For example, the interlock's retention capacity may be increased by welding the interlocks to the pedestal.

Alternative Embodiment

In an alternative embodiment 30', the interlock brackets are integral with the pedestal. The sidewalls 42' and 44' of the pedestal 36' extend over the top surface 68 of the rail mechanism 34. The sidewalls 42' and 44' each Include a floor flange 80, a support portion 82, a rail attachment portion 84, an upper retention flange 86, and a lower retention flange 85. The floor flange 80 is secured to the floor 100 by welding, bolts or other conventional fasteners. The support portion 82 is generally planar and extends upwardly and outwardly from the lower flange 80. The rail-attachment portion 84 is generally planar and extends vertically upward from the support portion 82. The rail-attachment portion 84 is substantially the same height as the sidewall 66 of the rail mechanism. The rail mechanism 34 is bolted or otherwise secured directly to the rail-attachment portion 84. The lower retention flange 85 is formed by cutting and bending inwardly a portion of the rail-attachment portion 84. The upper retention flange 86 extends horizontally inward from the rail-attachment portion 84 above the rail mechanism 34. The upper retention flange 86 preferably engages and is substantially the same width as the outer rail 34a.

The above description are those of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An automotive vehicle seat assembly, comprising:

a pedestal adapted to be mounted to an automotive vehicle;

a rail mechanism supported on said pedestal, said rail mechanism including a fixed rail and a movable rail; and an interlock means for retaining said rail mechanism on said pedestal, said interlock means fixedly secured to and extending from said pedestal and over both rails of said rail mechanism.

2. The assembly of claim 1 wherein said interlock includes an upright portion extending upwardly from said pedestal and along said rail mechanism; and a horizontal portion extending from said upright portion and over said rail mechanism.

3. The assembly of claim 2 wherein:

said rail mechanism includes left and fight pairs of fixed and movable rails; and said interlock means includes left and fight interlock portions, said left interlock portion extending over said left rail and said right interlock portion extending over said right rail.

4. An automotive seat pedestal assembly for securely supporting a seat rail mechanism having a fixed raft and a movable rail comprising:

a pedestal including support means for supporting the rail mechanism and securing means for securing the pedestal to a vehicle; and an interlock means for retaining the rail mechanism on said pedestal, said interlock means including a generally horizontal portion above said support means on said pedestal, said horizontal portion and said support portion defining a void therebetween for receiving the rail mechanism, said horizontal portion extending over both rails of the rail mechanism.

5. The pedestal of claim 4 wherein said interlock means includes an upright portion extending vertically upward from said pedestal, said horizontal portion extending from said upright portion.

6. The pedestal of claim 5 wherein said interlock means includes left and right portions to retain opposite portions of the rail assembly.

7. A pedestal for supporting an automotive vehicle seat, comprising:

a pedestal;

a seat rail mechanism mounted atop said pedestal and adapted to support the automotive vehicle seat, said rail mechanism including a fixed rail and movable rail; and an interlock fixedly connected to said pedestal and including a horizontal portion trapping said rail mechanism to prevent said rail mechanism from separating from said lower pedestal, said horizontal portion of said interlock extending over both rails of said rail mechanism.

8. The pedestal of claim 7 wherein said interlock includes an upright portion secured to and extending upwardly from said pedestal; and wherein said horizontal portion extends from said upright portion.

9. The pedestal of claim 8 wherein:

said rail mechanism includes-left and right pairs of fixed and movable rails; and said interlock includes left and right interlocks, said left interlock retaining said left rail pair and said right interlock retaining said right rail pair.

10. An improved automotive seat assembly comprising a pedestal, a rail mechanism supported by said pedestal and including a fixed rail and a movable rail, and a seat frame supported by said rail mechanism, wherein the improvement comprises said pedestal comprising:

an interlock means for securing said rail mechanism to said pedestal, said interlock extending from said pedestal over both rails of said rail mechanism.

11. The seat assembly of claim 10 wherein said interlock means includes:

a vertically extending upright portion; and a horizontal portion extending from said upright portion, said horizontal portion extending above both mils of said rail mechanism.

12. The seat assembly of claim 11 wherein said interlock means is integral with the remainder of said pedestal.

* * * * *

UNITED STATES PATENT AND TRADEMARK OFFICE
CERTIFICATE OF CORRECTION

PATENT NO. : 5,620,161
DATED : April 15, 1997
INVENTOR(S) : Donald W. Wisner et al It is certified that error appears in the above-indentified patent and that said Letters Patent is hereby corrected as shown below:

Column 4, Claim 3, Line 26:
   "fight" should be --right--

Column 4, Claim 3, Line 28:
   "fight" should be --right--

Column 4, Claim 4, Line 34:
   "raft" should be --rail--

Column 6, Claim 11, Line 8:
   "mils" should be --rails--

Signed and Sealed this

Twenty-sixth Day of August, 1997

Attest:

BRUCE LEHMAN

Attesting Officer

Commissioner of Patents and Trademarks